(12) United States Patent
Yamada et al.

(10) Patent No.: US 11,105,620 B2
(45) Date of Patent: Aug. 31, 2021

(54) PIPE DIAMETER DETERMINATION METHOD, PIPE DIAMETER DETERMINATION APPARATUS, AND REFRIGERATING APPARATUS

(71) Applicant: DAIKIN INDUSTRIES, LTD., Osaka (JP)

(72) Inventors: Takuro Yamada, Osaka (JP); Yuusuke Nakagawa, Osaka (JP); Masahiro Honda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/465,483

(22) PCT Filed: Nov. 30, 2017

(86) PCT No.: PCT/JP2017/043173
§ 371 (c)(1),
(2) Date: May 30, 2019

(87) PCT Pub. No.: WO2018/101439
PCT Pub. Date: Jun. 7, 2018

(65) Prior Publication Data
US 2019/0293417 A1    Sep. 26, 2019

(30) Foreign Application Priority Data
Nov. 30, 2016    (JP) .............................. JP2016-232207

(51) Int. Cl.
*F24F 1/32*    (2011.01)
*G01B 21/10*    (2006.01)
(Continued)

(52) U.S. Cl.
CPC ................ *G01B 21/10* (2013.01); *F24F 1/32* (2013.01); *F25B 49/02* (2013.01); *F25B 13/00* (2013.01)

(58) Field of Classification Search
CPC ......... F24F 1/32; F24F 13/00; F24F 2313/006
See application file for complete search history.

(56) References Cited

U.S. PATENT DOCUMENTS

| 4,138,859 A | 2/1979 | Pietsch |
| 6,477,848 B1 | 11/2002 | Domyo et al. |

(Continued)

FOREIGN PATENT DOCUMENTS

| CN | 2486923 Y | 4/2002 |
| CN | 104797887 A | 7/2015 |

(Continued)

OTHER PUBLICATIONS

Marchese. How to size Refrigeration system piping. Air Conditioning, Heating & Refrigeration news; Sep. 3, 2001;214, 1; ABI/INFORM® Professional Advanced. URL:https://web.archive.org/web/20170714095426/http://www.achrnews.com:80/articles/88313-how-to-size-refrigeration-system-piping> Retrieved Mar. 7, 2020 (Year: 2001).*

(Continued)

*Primary Examiner* — Edward F Landrum
*Assistant Examiner* — Alexis K Cox
(74) *Attorney, Agent, or Firm* — Osha Bergman Watanabe & Burton LLP (57) ABSTRACT

A method for determining a pipe diameter of a liquid-side connection pipe in a refrigeration apparatus includes causing a computer to obtain a heating capacity, maximum heating load, and maximum cooling load; causing the computer to determine a pipe diameter of the liquid-side connection pipe by reducing a reference pipe diameter based on either a (Continued)

value obtained by dividing the maximum heating load by the maximum cooling load or a value obtained by subtracting the maximum heating load from the heating capacity; and installing the refrigeration apparatus using the liquid-side connection pipe having the determined pipe diameter.

12 Claims, 4 Drawing Sheets

(51) Int. Cl.
*F25B 49/02* (2006.01)
*F25B 13/00* (2006.01)

(56) References Cited

U.S. PATENT DOCUMENTS

| | | | | |
|---|---|---|---|---|
| 2003/0056525 | A1* | 3/2003 | Taira | F25B 41/003 62/114 |
| 2003/0089124 | A1* | 5/2003 | Domyo | C09K 5/045 62/498 |
| 2003/0167780 | A1* | 9/2003 | Domyo | C09K 5/045 62/114 |
| 2004/0247500 | A1* | 12/2004 | Ashe | F28F 27/02 422/200 |
| 2005/0115271 | A1* | 6/2005 | Takegami | F25B 13/00 62/498 |
| 2005/0165591 | A1* | 7/2005 | Bahel | F25B 49/00 703/7 |
| 2009/0025406 | A1* | 1/2009 | Yoshimi | F24F 11/83 62/127 |
| 2009/0031739 | A1* | 2/2009 | Kasahara | F25B 13/00 62/196.1 |
| 2010/0212893 | A1* | 8/2010 | Moini Araghi | E21B 43/24 166/272.1 |
| 2012/0118005 | A1* | 5/2012 | Yamashita | F24F 3/06 62/513 |
| 2013/0067942 | A1* | 3/2013 | Ochiai | F25B 49/02 62/126 |
| 2014/0373569 | A1 | 12/2014 | Tsuboe et al. | |
| 2015/0292758 | A1 | 10/2015 | Motomura et al. | |

FOREIGN PATENT DOCUMENTS

| | | |
|---|---|---|
| EP | 2693130 A2 | 2/2014 |
| JP | 2000055483 A | 2/2000 |
| JP | 2001304702 A | 10/2001 |
| WO | 2013146103 A1 | 10/2013 |
| WO | 2016051606 A1 | 4/2016 |

OTHER PUBLICATIONS

Basic Air Conditioning Piping Recommendations. Retrieved from the internet <URL:https://yorkcentraltechtalk.wordpress.com/2013/07/01/basic-air-conditioning-piping-recommendations-liquid-lines> retrieved Mar. 8, 2020 (Year: 2013).*
International Search Report issued in corresponding application No. PCT/JP2017/043173 dated Feb. 27, 2018 (5 pages).
Written Opinion of the International Searching Authority issued in corresponding application No. PCT/JP2017/043173 dated Feb. 27, 2018 (7 pages).
Extended European Search Report issued in corresponding European Application No. 17875459.4 dated Nov. 21, 2019 (7 pages).
Hans-Joachim Breidert, "Die rechnerische, tabellarische und nomogrammatische Auslegung der kältemittelführenden Rohrleitungen in der Kälteanlage"; In: Projektierung von Kälteanlagen: Berechnung, Auslegung, Beispiele; XP055631792; pp. 92-132; Dec. 31, 2009 (42 pages).

* cited by examiner

PIPE DIAMETER DETERMINATION METHOD, PIPE DIAMETER DETERMINATION APPARATUS, AND REFRIGERATING APPARATUS

TECHNICAL FIELD

The present disclosure relates to a pipe diameter determination method, a pipe diameter determination apparatus, and a refrigeration apparatus.

BACKGROUND

Refrigeration apparatuses including an outdoor unit and an indoor unit connected to each other via a connection pipe and capable of performing a cooling operation and a heating operation are used.

In some of these refrigeration apparatuses, the amount of refrigerant in the connection pipe changes depending on whether a cooling operation or a heating operation is performed, as described in, for example, PTL 1 (Japanese Unexamined Patent Application Publication No. 2000-55483).

Such refrigeration apparatuses in which the amount of refrigerant in the connection pipe changes depending on whether a cooling operation or a heating operation is performed are constructed in various environments. For example, the refrigeration apparatuses may be constructed in cold climate regions in which the heating load is large, in warm climate regions in which the cooling load is large, and in buildings having an inferior thermal insulation function.

In each of these construction locations, an appropriate maximum cooling load and maximum heating load depend on the surrounding environments, and a refrigeration apparatus that includes an outdoor unit and an indoor unit capable of handling both the maximum cooling load and the maximum heating load should be selected. In a case of selecting refrigeration apparatuses as described above, refrigeration apparatuses having various cooling capacities and various heating capacities are selected.

However, in a case where the type of refrigeration apparatus to be constructed is selected based on the maximum cooling load and the maximum heating load, no consideration has been given to reduce the amount of refrigerant with which the selected type of refrigeration apparatus is charged.

PATENT LITERATURE

PTL 1: Japanese Unexamined Patent Application Publication No. 2000-55483

SUMMARY

A pipe diameter determination method according to one or more embodiments is a pipe diameter determination method for determining a pipe diameter of a liquid-side connection pipe of a refrigeration apparatus. The refrigeration apparatus includes an outdoor unit having a compressor and an outdoor heat exchanger, an indoor unit having an indoor heat exchanger, and the liquid-side connection pipe and a gas-side connection pipe connecting the outdoor unit and the indoor unit with each other, and is capable of performing a cooling operation and a heating operation. In this pipe diameter determination method, the pipe diameter of the liquid-side connection pipe is determined based on a cooling capacity and a heating capacity provided by the outdoor unit and the indoor unit that are installed.

As the refrigeration apparatus, for example, a refrigeration apparatus that can handle a maximum cooling load and a maximum heating load selected in accordance with an environment at a location where the refrigeration apparatus is installed is selected as appropriate and installed.

Here, with this pipe diameter determination method, the pipe diameter of the liquid-side connection pipe is determined based on the cooling capacity and the heating capacity provided by the outdoor unit and the indoor unit that are installed. Therefore, the pipe diameter of the liquid-side connection pipe can be made smaller than that in a case where the pipe diameter of the liquid-side connection pipe is determined uniformly regardless of the cooling capacity and the heating capacity.

A pipe diameter determination method according to one or more embodiments, further includes obtaining a maximum cooling load and a maximum heating load at a location where the refrigeration apparatus is installed, in which the pipe diameter of the liquid-side connection pipe is determined by using a relation between the cooling/heating capacity of the refrigeration apparatus and the maximum cooling/heating load.

Here, the method for determining the maximum cooling load and the maximum heating load at the location where the refrigeration apparatus is installed can be arbitrary, and the maximum cooling load and the maximum heating load can be obtained by, for example, using a method that is indicated in an air conditioning handbook, etc. and is well known to a person skilled in the art, by taking into consideration at least one of climate data of a region in which the refrigeration apparatus is installed, the thermal insulation performance (grade, rank, etc.) of a building in which the refrigeration apparatus is installed, a thermal load due to internal heat generation, and so on.

When the pipe diameter of the liquid-side connection pipe is determined, for example, the pipe diameter of the liquid-side connection pipe that is determined in advance in accordance with the cooling capacity and the heating capacity of the refrigeration apparatus may be used as a reference pipe diameter, and the reference pipe diameter may be corrected to a smaller pipe diameter by using the relation between the cooling/heating capacity of the refrigeration apparatus and the maximum cooling/heating load to thereby determine the pipe diameter of the liquid-side connection pipe.

Further, the ratio of the heating capacity relative to the cooling capacity provided by the refrigeration apparatus may be selected as cooling capacity: heating capacity=1.0: 1.0 to 1.0:1.2.

With this pipe diameter determination method, when the pipe diameter of the liquid-side connection pipe is determined, the relation between the cooling/heating capacity of the refrigeration apparatus and the maximum cooling/heating load that depends on the location where the refrigeration apparatus is installed is used. Here, the cooling capacity and the heating capacity provided by the selected refrigeration apparatus do not completely match the maximum cooling load and the maximum heating load at the location where the refrigeration apparatus is installed and may differ from each other, and the cooling capacity and/or the heating capacity of the refrigeration apparatus may exceed the maximum cooling load and/or the maximum heating load that are required to be handled. Therefore, when the pipe diameter of the liquid-side connection pipe is determined so as to be smaller in accordance with the excessive amounts of the cooling capacity and/or the heating capacity of the refrigeration apparatus relative to the maximum cooling load and/or the maximum heating load that are required to be handled, the amount of refrigerant with which the refrigeration apparatus is charged can be reduced while the pressure loss of the refrigerant is suppressed to some extent.

In a pipe diameter determination method according to one or more embodiments, the outdoor unit has a cooling portion in which a refrigerant that passes through the outdoor heat exchanger and is to be fed to the liquid-side connection pipe is cooled during a cooling operation, and the pipe diameter of the liquid-side connection pipe is determined so as to be smaller as a value indicating a ratio of the maximum heating load relative to the maximum cooling load decreases or a value obtained by subtracting the maximum heating load from the heating capacity increases.

Here, the value indicating the ratio of the maximum heating load relative to the maximum cooling load, for example, may be a cooling-heating ratio (maximum heating load/maximum cooling load), which is a value obtained by dividing the maximum heating load by the maximum cooling load.

Further, the refrigerant that passes through the outdoor heat exchanger and is to be fed to the liquid-side connection pipe may be put into a predetermined subcooling state during a cooling operation by the cooling portion.

In the refrigeration apparatus for which this pipe diameter determination method is used, during a cooling operation, the refrigerant that passes through the outdoor heat exchanger and is to be fed to the liquid-side connection pipe is cooled by the cooling portion and becomes a refrigerant having a high density. On the other hand, during a heating operation, refrigerants that radiate heat in the indoor heat exchanger, and thereafter, flow toward the liquid-side connection pipe are not cooled by the cooling portion. Therefore, in the refrigeration apparatus, it is likely that a liquid refrigerant is supplied to the liquid-side connection pipe during a cooling operation, while the density of the refrigerant that is supplied to the liquid-side connection pipe is low and a refrigerant in a gas-liquid two-phase state tends to be supplied during a heating operation. Therefore, the pressure loss of the refrigerant passing through the liquid-side connection pipe is reduced during a cooling operation, while the pressure loss of the refrigerant flowing through the liquid-side connection pipe tends to increase during a heating operation unlike during a cooling operation.

Accordingly, the pipe diameter of the liquid-side connection pipe of the refrigeration apparatus can be determined so as to reduce the pressure loss during a heating operation to an allowable pressure loss rather than to reduce the pressure loss during a cooling operation. Here, in a case where the value that indicates the ratio of the maximum heating load relative to the maximum cooling load at the location where the refrigeration apparatus is installed is small or in a case where the value obtained by subtracting the maximum heating load from the heating capacity is large, the magnitude of the pressure loss of the refrigerant that flows through the liquid-side connection pipe during a heating operation does not become so large. In this case, even if the pipe diameter of the liquid-side connection pipe is further made smaller, the pressure loss of the refrigerant that flows through the liquid-side connection pipe during a heating operation does not become excessively large and tends to be within an allowable pressure loss range. When the pipe diameter of the liquid-side connection pipe is thus made smaller, the amount of refrigerant with which the refrigeration apparatus is charged can be further reduced.

In a pipe diameter determination method according to one or more embodiments, the pipe diameter of the liquid-side connection pipe is determined so as to be smaller in a stepwise manner as the value indicating the ratio of the maximum heating load relative to the maximum cooling load decreases or the value obtained by subtracting the maximum heating load from the heating capacity increases.

With this pipe diameter determination method, even if the pipe diameter of the liquid-side connection pipe is made smaller in a stepwise manner, the maximum heating load can be handled, and the amount of refrigerant with which the refrigeration apparatus is charged can be reduced in a stepwise manner.

In a pipe diameter determination method according to one or more embodiments, a refrigerant that passes through the outdoor heat exchanger and flows toward the indoor heat exchanger and that is in a liquid single-phase state is supplied to the liquid-side connection pipe.

Specifically, for example, a refrigerant that flows through an inlet of the liquid-side connection pipe during a cooling operation is put into a liquid single-phase state.

Here, the refrigerant that passes through the outdoor heat exchanger and flows toward the indoor heat exchanger means a refrigerant that is discharged from the compressor, passes through the outdoor heat exchanger, and flows toward the indoor heat exchanger in a state where the refrigerant circuit can perform a cooling operation.

With this pipe diameter determination method, for the refrigeration apparatus in which the refrigerant in a liquid single-phase state having a density higher than that of a refrigerant in a gas-liquid two-phase state is supplied toward the liquid-side connection pipe, the pipe diameter of the liquid-side connection pipe is determined so as to be smaller. Therefore, the charge amount of refrigerant in a liquid single-phase state having a high density can be reduced, and an effect in which the amount of refrigerant with which the refrigeration apparatus is charged is reduced can be further increased.

In a pipe diameter determination method according to one or more embodiments, the refrigeration apparatus is charged with a mildly flammable refrigerant.

Here, the mildly flammable refrigerant can be arbitrary, and examples thereof include R32 refrigerant.

With this pipe diameter determination method, the amount of mildly flammable refrigerant with which the refrigeration apparatus is charged can be reduced, and therefore, risks that are assumed in case the mildly flammable refrigerant leaks out can be reduced.

A pipe diameter determination apparatus according to one or more embodiments is a pipe diameter determination apparatus for determining a pipe diameter of a liquid-side connection pipe of a refrigeration apparatus, including an information obtaining unit, a pipe diameter determination unit, and an output unit. The refrigeration apparatus includes an outdoor unit having a compressor and an outdoor heat exchanger, an indoor unit having an indoor heat exchanger, and the liquid-side connection pipe and a gas-side connection pipe connecting the outdoor unit and the indoor unit with each other. The information obtaining unit obtains information about a cooling capacity and a heating capacity provided by the outdoor unit and the indoor unit that are installed. The pipe diameter determination unit determines the pipe diameter of the liquid-side connection pipe based on the information obtained by the information obtaining unit. The output unit outputs the pipe diameter of the liquid-side connection pipe determined by the pipe diameter determination unit.

As the refrigeration apparatus, for example, a refrigeration apparatus that can handle a maximum cooling load and a maximum heating load depending on an environment of a location where the refrigeration apparatus is installed is selected.

Here, in this pipe diameter determination apparatus, based on the information obtained by the information obtaining unit about the cooling capacity and the heating capacity provided by the outdoor unit and the indoor unit that are to be installed, a processing unit determines the pipe diameter of the liquid-side connection pipe. Further, the output unit outputs the pipe diameter of the liquid-side connection pipe determined by the processing unit. Therefore, a pipe diameter smaller than that in a case where the pipe diameter of the liquid-side connection pipe is determined uniformly regardless of the cooling capacity and the heating capacity can be automatically determined.

In a pipe diameter determination method according to one or more embodiments, the information obtaining unit further obtains information about a maximum cooling load and a maximum heating load depending on a location where the refrigeration apparatus is installed, and the pipe diameter determination unit determines the pipe diameter of the liquid-side connection pipe by using a relation between the cooling/heating capacity of the refrigeration apparatus and the maximum cooling/heating load.

Here, the method for determining the maximum cooling load and the maximum heating load at the location where the refrigeration apparatus is installed can be obtained by, for example, using a method that is indicated in an air conditioning handbook, etc. and is well known to a person skilled in the art, by taking into consideration at least one of climate data of a region in which the refrigeration apparatus is installed, the thermal insulation performance (grade, rank, etc.) of a building in which the refrigeration apparatus is installed, a thermal load due to internal heat generation, and so on.

When the pipe diameter of the liquid-side connection pipe is determined, for example, the pipe diameter of the liquid-side connection pipe that is determined in advance in accordance with the cooling capacity and the heating capacity of the refrigeration apparatus may be used as a reference pipe diameter, and the reference pipe diameter may be corrected to a smaller pipe diameter by using the relation between the cooling/heating capacity of the refrigeration apparatus and the maximum cooling/heating load to thereby determine the pipe diameter of the liquid-side connection pipe.

Further, the ratio of the heating capacity relative to the cooling capacity provided by the refrigeration apparatus may be selected as cooling capacity: heating capacity=1.0:1.0 to 1.0:1.2.

In this pipe diameter determination apparatus, when the pipe diameter of the liquid-side connection pipe is determined, the relation between the cooling/heating capacity of the refrigeration apparatus and the maximum cooling/heating load that depends on the location where the refrigeration apparatus is installed is used. Here, the cooling capacity and the heating capacity provided by the selected refrigeration apparatus do not completely match the maximum cooling load and the maximum heating load at the location where the refrigeration apparatus is installed and may differ from each other, and the cooling capacity and/or the heating capacity of the refrigeration apparatus may exceed the maximum cooling load and/or the maximum heating load that are required to be handled. Therefore, when the pipe diameter determination unit of the pipe diameter determination apparatus determines the pipe diameter of the liquid-side connection pipe so as to be smaller in accordance with the excessive amounts of the cooling capacity and/or the heating capacity of the refrigeration apparatus relative to the maximum cooling load and/or the maximum heating load that are required to be handled, the amount of refrigerant with which the refrigeration apparatus is charged can be reduced while the pressure loss of the refrigerant is suppressed to some extent.

A refrigeration apparatus according to one or more embodiments includes an outdoor unit having a compressor and an outdoor heat exchanger; an indoor unit having an indoor heat exchanger; a liquid-side connection pipe and a gas-side connection pipe connecting the outdoor unit and the indoor unit with each other; and the pipe diameter determination apparatus according to one or more embodiments.

This refrigeration apparatus includes the pipe diameter determination apparatus, and therefore, the pipe diameter of the liquid-side connection pipe can be determined when the refrigeration apparatus is constructed.

DETAILED DESCRIPTION (1) Configuration of Refrigeration Apparatus

Figure 1:
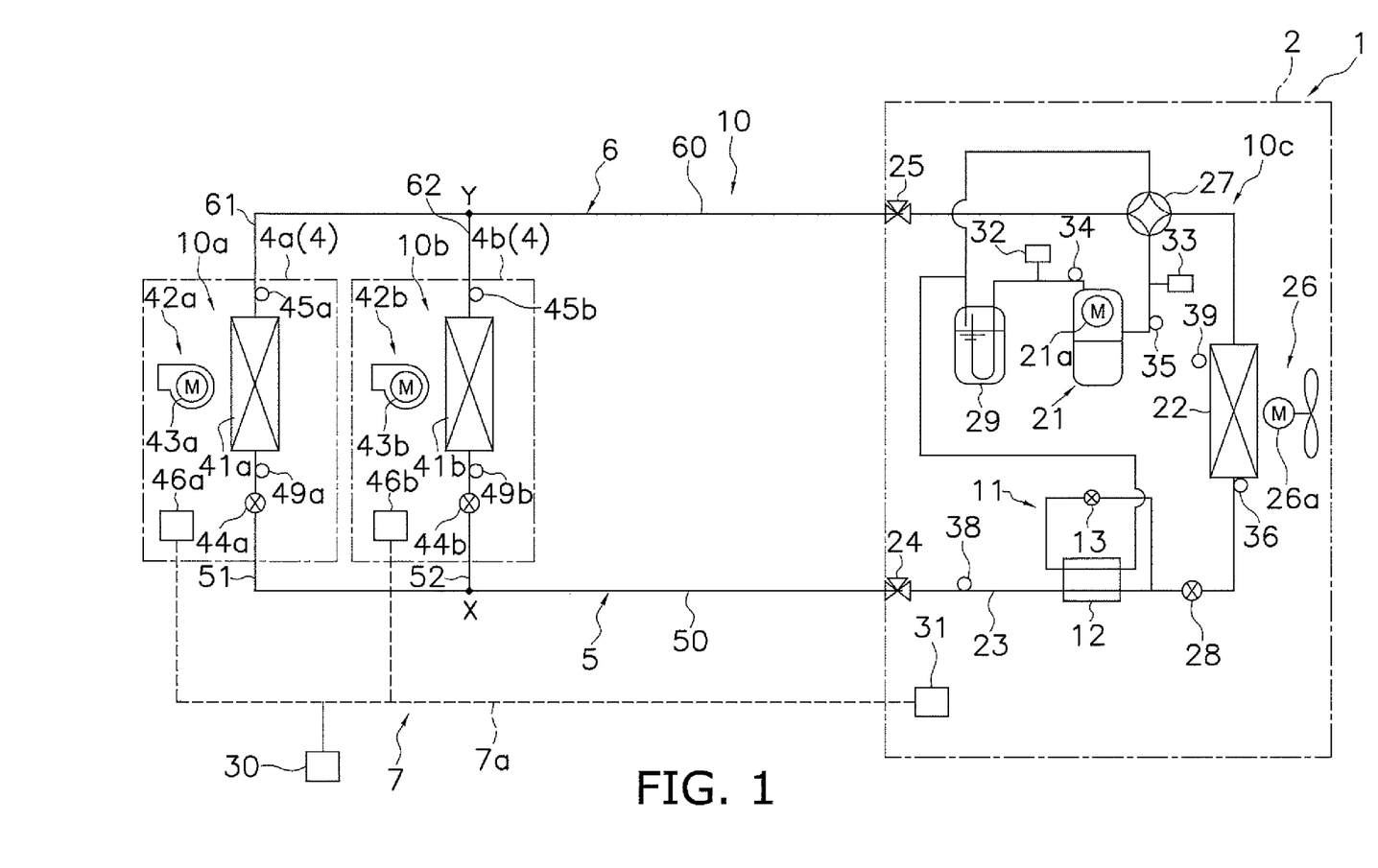
FIG. 1 is an overall configuration diagram of a refrigeration apparatus for which a pipe diameter determination method according to one or more embodiments is used.

FIG. 1 is an overall configuration diagram of a refrigeration apparatus 1.

The refrigeration apparatus 1 is an apparatus that is used to cool and heat rooms in a building, etc. by performing a vapor compression refrigeration cycle operation. The refrigeration apparatus 1 mainly includes an outdoor unit 2, indoor units 4 (a first indoor unit 4a and a second indoor unit 4b), and a liquid-side connection pipe 5 and a gas-side connection pipe 6 connecting the outdoor unit 2 and the indoor units 4 with each other. That is, the refrigeration apparatus 1 has a vapor compression refrigerant circuit 10 formed by connecting the outdoor unit 2, the indoor units 4, and the liquid-side connection pipe 5 and the gas-side connection pipe 6.

The refrigerant circuit 10 according to one or more embodiments is charged with R32 refrigerant.

(1-1) Indoor Units

The indoor units 4 are installed in a building, etc. such that, for example, the indoor units 4 are concealed in or suspended from a ceiling or are mounted on an indoor wall. The indoor units 4 are connected to the outdoor unit 2 via the liquid-side connection pipe 5 and the gas-side connection pipe 6 and constitute part of the refrigerant circuit 10, which is a main circuit.

According to one or more embodiments, the plurality of indoor units 4 are connected in parallel with each other in the refrigerant circuit 10. Specifically, the first indoor unit 4a and the second indoor unit 4b are connected in parallel with each other in the refrigerant circuit 10, and branch pipes of each of the liquid-side connection pipe 5 and the gas-side connection pipe 6 are connected to the first indoor unit 4a and the second indoor unit 4b.

Now, the configuration of the first indoor unit 4a is described.

The first indoor unit 4a mainly has a first indoor-side refrigerant circuit 10a that constitutes part of the refrigerant circuit 10, which is the main circuit. The first indoor-side refrigerant circuit 10a mainly has a first indoor expansion valve 44a and a first indoor heat exchanger 41a.

The first indoor expansion valve 44a is constituted by an electronic expansion valve and is disposed on the liquid side of the first indoor heat exchanger 41a.

The first indoor heat exchanger 41a is a cross-fin type fin-and-tube heat exchanger constituted by a heat transfer tube and a large number of fins. The first indoor heat exchanger 41a is a heat exchanger that functions as an evaporator for refrigerant to cool indoor air during a cooling operation and functions as a radiator or a condenser for refrigerant to heat indoor air during a heating operation.

The first indoor unit 4a has a first indoor fan 42a for taking indoor air into the unit and supplying, indoors as supply air, the air that has been subjected to heat exchange with a refrigerant in the first indoor heat exchanger 41a. The first indoor fan 42a is, for example, a centrifugal fan or a multiblade fan and has a first indoor fan motor 43a for driving. The first indoor unit 4a is provided with a first indoor gas-side refrigerant temperature sensor 45a that detects the temperature of a refrigerant flowing on the gas side of the first indoor heat exchanger 41a. Further, the first indoor unit 4a is provided with a first indoor liquid-side refrigerant temperature sensor 49a that detects the temperature of a refrigerant flowing between the liquid side of the first indoor heat exchanger 41a and the first indoor expansion valve 44a.

Further, the first indoor unit 4a has a first indoor control unit 46a that controls operations of each component constituting the first indoor unit 4a. The first indoor control unit 46a has a microcomputer, a memory, etc. that are provided for controlling the first indoor unit 4a to allow control signals, etc. to be exchanged with a remote controller (not illustrated) used to separately operate the first indoor unit 4a and to allow control signals, etc. to be exchanged with the outdoor unit 2 via a transmission line 7a.

The second indoor unit 4b has a second indoor-side refrigerant circuit 10b having a second indoor expansion valve 44b and a second indoor heat exchanger 41b, a second indoor fan 42b having a second indoor fan motor 43b, a second indoor gas-side refrigerant temperature sensor 45b, a second indoor liquid-side refrigerant temperature sensor 49b, and a second indoor control unit 46b. The configuration of the second indoor unit 4b is similar to that of the first indoor unit 4a, therefore, a description thereof will be omitted here.

(1-2) Outdoor Unit

The outdoor unit 2 is installed outside a building, etc., is connected to the indoor units 4 via the liquid-side connection pipe 5 and the gas-side connection pipe 6, and constitutes the refrigerant circuit 10 together with the indoor units 4.

Now, the configuration of the outdoor unit 2 is described.

The outdoor unit 2 has an outdoor-side refrigerant circuit 10c that constitutes part of the refrigerant circuit 10. The outdoor-side refrigerant circuit 10c mainly has a compressor 21, an outdoor heat exchanger 22, a subcooling circuit 11, a subcooling heat exchanger 12 (corresponding to a cooling portion), an outdoor expansion valve 28, an accumulator 29, a four-way switching valve 27, a liquid-side shutoff valve 24, and a gas-side shutoff valve 25.

The compressor 21 is a positive-displacement compressor that is driven by a compressor motor 21a. The compressor motor 21a is supplied with power via an inverter device (not illustrated) and driven and can change the operating capacity by changing the frequency (that is, the number of revolutions).

The outdoor heat exchanger 22 is a cross-fin type fin-and-tube heat exchanger constituted by a heat transfer tube and a large number of fins. The outdoor heat exchanger 22 is a heat exchanger that functions as a radiator or a condenser for refrigerant during a cooling operation and functions as an evaporator for refrigerant during a heating operation. The gas side of the outdoor heat exchanger 22 is connected to the compressor 21, and the liquid side thereof is connected to the subcooling heat exchanger 12 via the outdoor expansion valve 28.

The outdoor unit 2 has an outdoor fan 26 that is a fan portion for taking outdoor air into the unit and discharging outdoors the air that has been subjected to heat exchange with a refrigerant in the outdoor heat exchanger 22. The outdoor fan 26 is a fan that can change the airflow volume of outdoor air to be supplied to the outdoor heat exchanger 22 as a heat source and, according to one or more embodiments, is a propeller fan or the like driven by an outdoor fan motor 26a constituted by a DC fan motor. The outdoor fan motor 26a is supplied with power via an inverter device (not illustrated) and driven.

The subcooling circuit 11 branches from a point between the outdoor heat exchanger 22 and the subcooling heat exchanger 12 and is a circuit that is connected to a point between the four-way switching valve 27 and the accumulator 29. In the subcooling circuit 11, a subcooling expansion valve 13 that decompresses a refrigerant flowing through the subcooling heat exchanger 12 on the upstream side is provided. The subcooling circuit 11 can increase the degree of subcooling of a refrigerant that flows from the outdoor heat exchanger 22 toward the outdoor expansion valve 28.

The outdoor expansion valve 28 is provided between the outdoor heat exchanger 22 and the subcooling heat exchanger 12 to, for example, regulate the flow rate of a refrigerant that flows in the outdoor-side refrigerant circuit 10c. Specifically, according to one or more embodiments, the outdoor expansion valve 28 in the refrigerant circuit 10 is provided between the outdoor heat exchanger 22 and the branch position from which the subcooling circuit 11 branches.

The accumulator 29 is provided between the four-way switching valve 27 and the compressor 21 on the suction side of the compressor 21 and can separate a refrigerant in a liquid state and a refrigerant in a gaseous state from each other.

When the connection state of the four-way switching valve 27 is switched, switching between a cooling operation connection state and a heating operation connection state can be performed. In the cooling operation connection state, the downstream side of the accumulator 29 and the gas-side shutoff valve 25 are connected to each other while the discharge side of the compressor 21 and the outdoor heat exchanger 22 are connected to each other. In the heating operation connection state, the downstream side of the accumulator 29 and the outdoor heat exchanger 22 are connected to each other while the discharge side of the compressor 21 and the gas-side shutoff valve 25 are connected to each other.

The liquid-side shutoff valve 24 and the gas-side shutoff valve 25 are valves provided at connecting ports for connection with external devices or pipes (specifically, the liquid-side connection pipe 5 and the gas-side connection pipe 6). The liquid-side shutoff valve 24 is connected to the outdoor expansion valve 28 on the side opposite the outdoor heat exchanger 22 side via a pipe. The gas-side shutoff valve 25 is connected to one of the connection ports of the four-way switching valve 27 via a pipe.

Further, the outdoor unit 2 is provided with various sensors. Specifically, the outdoor unit 2 is provided with a suction pressure sensor 32 that detects the suction pressure of the compressor 21, a discharge pressure sensor 33 that detects the discharge pressure of the compressor 21, a suction temperature sensor 34 that detects the suction temperature of the compressor 21, a discharge temperature sensor 35 that detects the discharge temperature of the compressor 21, an outdoor heat-exchange liquid-side temperature sensor 36 that detects the temperature (outdoor heat-exchange outlet temperature) of a refrigerant at the liquid-side end of the outdoor heat exchanger 22, a liquid pipe temperature sensor 38 that detects the temperature of a refrigerant flowing through an outdoor liquid refrigerant pipe 23 connecting the outdoor expansion valve 28 with the liquid-side shutoff valve 24, and an outside air temperature sensor 39 that functions as a temperature detection unit detecting the outside air temperature.

Further, the outdoor unit 2 has an outdoor control unit 31 that controls operations of each component constituting the outdoor unit 2. The outdoor control unit 31 has, for example, a microcomputer and a memory that are provided for controlling the outdoor unit 2 and an inverter circuit for controlling the compressor motor 21a, the outdoor fan motor 26a, the outdoor expansion valve 28, etc. to allow control signals, etc. to be exchanged with the first indoor control unit 46a of the first indoor unit 4a and the second indoor control unit 46b of the second indoor unit 4b via the transmission line 7a. That is, the first indoor control unit 46a, the second indoor control unit 46b, the outdoor control unit 31, and the transmission line 7a connecting the first indoor control unit 46a, the second indoor control unit 46b, and the outdoor control unit 31 constitute a control unit 7 that controls the entire operation of the refrigeration apparatus 1.

Figure 2:
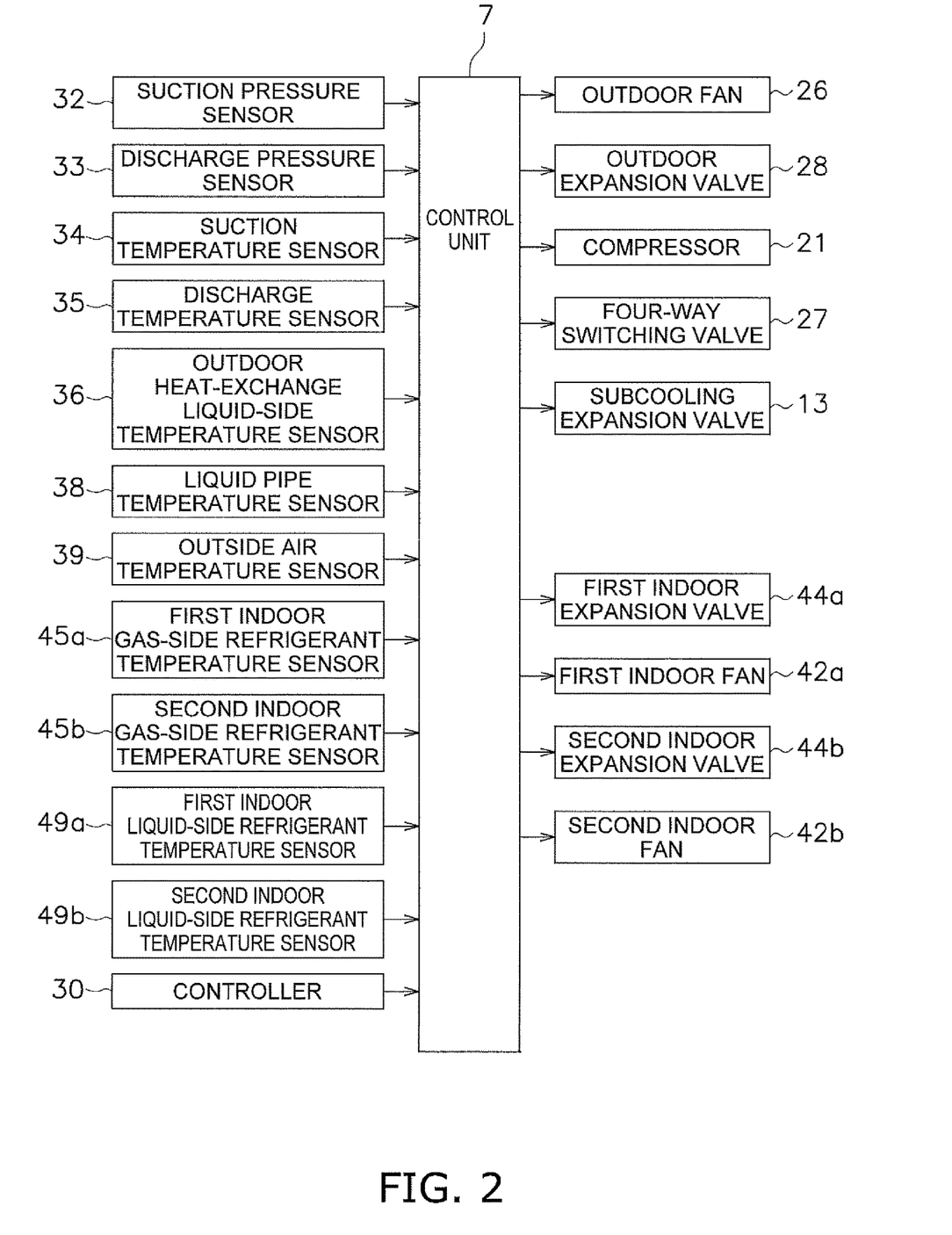
FIG. 2 is a block diagram of a control system of the refrigeration apparatus.

As illustrated in FIG. 2, the control unit 7 is connected to the sensors 32 to 39, 45a, 45b, 49a, and 49b so that the control unit 7 can receive detection signals from the sensors 32 to 39, 45a, 45b, 49a, and 49b, and is connected to various devices, namely, the four-way switching valve 27, the compressor 21, the outdoor fan 26, the outdoor expansion valve 28, the subcooling expansion valve 13, the first indoor expansion valve 44a, the first indoor fan 42a, the second indoor expansion valve 44b, and the second indoor fan 42b so that the control unit 7 can control the devices based on the detection signals. FIG. 2 referenced here is a control block diagram of the refrigeration apparatus 1. The control unit 7 is connected to a controller 30 that accepts various settings input from a user and monitors, manages, or controls the refrigeration apparatus 1, and has a memory not illustrated.

(1-3) Connection Pipes

The liquid-side connection pipe 5 and the gas-side connection pipe 6 are refrigerant pipes that are constructed on site when the refrigeration apparatus 1 is installed at an installation location, such as a building, and pipes having various lengths and pipe diameters are used in accordance with installation conditions including the installation location, a combination of an outdoor unit and indoor units, etc.

As described above, the first indoor-side refrigerant circuit 10a and the second indoor-side refrigerant circuit 10b, the outdoor-side refrigerant circuit 10c, and the liquid-side connection pipe 5 and the gas-side connection pipe 6 are connected, that is, the compressor 21, the outdoor heat exchanger 22, the outdoor expansion valve 28, the liquid-side connection pipe 5, the indoor expansion valves 44, the indoor heat exchangers 41, and the gas-side connection pipe 6 are sequentially connected, to thereby constitute the refrigerant circuit 10 of the refrigeration apparatus 1.

The liquid-side connection pipe 5 is constituted by a main liquid-side connection pipe 50, a first indoor liquid-side branch pipe 51, and a second indoor liquid-side branch pipe 52. The main liquid-side connection pipe 50 extends so as to connect the liquid-side shutoff valve 24 of the outdoor unit 2 with a branch point X. The first indoor liquid-side branch pipe 51 extends so as to connect the branch point X with the first indoor unit 4a (an outlet of the first indoor unit 4a on a side on which the first indoor expansion valve 44a is provided). The second indoor liquid-side branch pipe 52 extends so as to connect the branch point X with the second indoor unit 4b (an outlet of the second indoor unit 4b on a side on which the second indoor expansion valve 44b is provided).

The gas-side connection pipe 6 is constituted by a main gas-side connection pipe 60, a first indoor gas-side branch pipe 61, and a second indoor gas-side branch pipe 62. The main gas-side connection pipe 60 extends so as to connect the gas-side shutoff valve 25 of the outdoor unit 2 with a branch point Y. The first indoor gas-side branch pipe 61 extends so as to connect the branch point Y with the first indoor unit 4a (an outlet of the first indoor unit 4a on a side on which the first indoor heat exchanger 41a is provided). The second indoor gas-side branch pipe 62 extends so as to connect the branch point Y with the second indoor unit 4b (an outlet of the second indoor unit 4b on a side on which the second indoor heat exchanger 41b is provided).

(2) Refrigeration Cycle in Refrigerant Circuit 10

In the refrigerant circuit 10 of the refrigeration apparatus 1, the connection state of the four-way switching valve 27 is switched to perform a cooling operation and a heating operation.

(2-1) Cooling Operation

A cooling operation is performed in a state where the connection state of the four-way switching valve 27 is switched so that the discharge side of the compressor 21 is on the outdoor heat exchanger 22 side and the suction side of the compressor 21 is on the indoor heat exchangers 41a and 41b side.

The frequency of the compressor 21 is controlled by the control unit 7 so as to achieve a target low pressure so that a predetermined cooling load in each indoor unit can be handled. Accordingly, a refrigerant having a low pressure and sucked into the compressor 21 is discharged from the compressor 21 as a refrigerant having a high pressure and flows into the outdoor heat exchanger 22 via the four-way switching valve 27.

The refrigerant flowing into the outdoor heat exchanger 22 radiates heat thereof and condenses.

The refrigerant flows from the outdoor heat exchanger 22 toward the outdoor expansion valve 28, passes through the outdoor expansion valve 28, which is controlled by the control unit 7 to be in a full-open state during a cooling operation, and flows into the subcooling heat exchanger 12.

The refrigerant flowing into the subcooling heat exchanger 12 is subjected to heat exchange with a refrigerant flowing through the subcooling circuit 11 (a refrigerant decompressed by the subcooling expansion valve 13) in the subcooling heat exchanger 12, and a resulting refrigerant in a liquid single-phase state having an increased degree of subcooling flows toward the liquid-side shutoff valve 24. The refrigerant that is sufficiently cooled in the subcooling heat exchanger 12 can be fed to the indoor units 4a and 4b, and therefore, it becomes easier to handle the cooling load without increasing the amount of circulation. The liquid refrigerant for which the density is increased by cooling can be efficiently fed, and therefore, it is possible to also reduce the amount of refrigerant passing through the liquid-side connection pipe 5 to reduce pressure loss.

In a cooling operation, the valve opening degree of the subcooling expansion valve 13 is controlled by the control unit 7 so that the degree of subcooling of the refrigerant passing through the subcooling heat exchanger 12 and flowing toward the liquid-side shutoff valve 24 matches a target degree of subcooling. Specifically, the control unit 7 controls the valve opening degree of the subcooling expansion valve 13 so that a degree of subcooling obtained by subtracting a saturation temperature corresponding to a pressure obtained by the discharge pressure sensor 33 from a temperature obtained by the liquid pipe temperature sensor 38 matches the target degree of subcooling. Accordingly, the refrigerant that has passed through the subcooling heat exchanger 12 becomes a refrigerant in a liquid single-phase state having a sufficient degree of subcooling.

The refrigerant that has passed through the subcooling heat exchanger 12 passes through the outdoor liquid refrigerant pipe 23 and the liquid-side shutoff valve 24 and is fed to the liquid-side connection pipe 5.

The refrigerant flowing through the liquid-side connection pipe 5 is fed to the indoor units 4a and 4b. Here, the refrigerant passing through the outdoor liquid refrigerant pipe 23 and the liquid-side connection pipe 5 is subjected to a pressure loss during passing, and therefore, the pressure of the refrigerant becomes lower. The refrigerant passing through the outdoor liquid refrigerant pipe 23 and the liquid-side connection pipe 5 is subjected to a pressure loss, which differs in accordance with the length and the pipe diameter of the liquid-side connection pipe 5 that is constructed and the flow velocity of the refrigerant, and the refrigerant is subjected to a larger pressure loss as the length of the liquid-side connection pipe 5 increases, as the pipe diameter (inside diameter) of the liquid-side connection pipe 5 decreases, and further, as the flow velocity of the flowing refrigerant increases.

The refrigerant that passes through the main liquid-side connection pipe 50 of the liquid-side connection pipe 5 and flows up to the branch point X splits to flow into the first indoor unit 4a via the first indoor liquid-side branch pipe 51 and flow into the second indoor unit 4b via the second indoor liquid-side branch pipe 52. The refrigerant flowing into the first indoor unit 4a is decompressed by the first indoor expansion valve 44a to a low pressure in the refrigeration cycle, and the refrigerant flowing into the second indoor unit 4b is similarly decompressed by the second indoor expansion valve 44b to the low pressure in the refrigeration cycle. The valve opening degree of the first indoor expansion valve 44a may be controlled by the control unit 7 so that the degree of superheating of the refrigerant on the outlet side of the first indoor heat exchanger 41a matches a predetermined target degree of superheating. In this case, the control unit 7 may obtain the degree of superheating of the refrigerant at the gas-side outlet of the first indoor heat exchanger 41a by subtracting the saturation temperature of the refrigerant obtained by converting a pressure detected by the suction pressure sensor 32 from a temperature detected by the first indoor gas-side refrigerant temperature sensor 45a. The valve opening degree of the second indoor expansion valve 44b may be similarly controlled.

The refrigerant decompressed by the first indoor expansion valve 44a of the first indoor unit 4a evaporates in the first indoor heat exchanger 41a and flows toward the first indoor gas-side branch pipe 61. Similarly, the refrigerant decompressed by the second indoor expansion valve 44b of the second indoor unit 4b evaporates in the second indoor heat exchanger 41b and flows toward the second indoor gas-side branch pipe 62. The refrigerant evaporating in the first indoor heat exchanger 41a and the refrigerant evaporating in the second indoor heat exchanger 41b merge at the branch point Y at which the first indoor gas-side branch pipe 61, the second indoor gas-side branch pipe 62, and the main gas-side connection pipe 60 of the gas-side connection pipe 6 are connected to one another, and the resulting refrigerant flows through the main gas-side connection pipe 60, and thereafter, is again sucked into the compressor 21 via the gas-side shutoff valve 25, the four-way switching valve 27, and the accumulator 29 of the outdoor unit 2. The refrigerant that has flowed through the subcooling circuit 11 described above merges at a point between the four-way switching valve 27 and the accumulator 29.

(2-2) Heating Operation

A heating operation is performed in a state where the connection state of the four-way switching valve 27 is switched so that the discharge side of the compressor 21 is on the indoor heat exchangers 41a and 41b side and the suction side of the compressor 21 is on the outdoor heat exchanger 22 side.

The frequency of the compressor 21 is controlled by the control unit 7 so as to achieve a target high pressure so that a predetermined heating load in each indoor unit can be handled. Accordingly, a refrigerant having a high pressure and discharged from the compressor 21 flows toward the indoor units 4a and 4b via the four-way switching valve 27 and the gas-side connection pipe 6.

Here, the refrigerant that passes through the main gas-side connection pipe 60 of the gas-side connection pipe 6 and flows up to the branch point Y splits to flow into the first indoor unit 4a via the first indoor gas-side branch pipe 61 and flow into the second indoor unit 4b via the second indoor gas-side branch pipe 62. The refrigerant flowing into the first indoor unit 4a radiates heat in the first indoor heat exchanger 41a and condenses. Similarly, the refrigerant flowing into the second indoor unit 4b radiates heat in the second indoor heat exchanger 41b and condenses. The valve opening degree of the first indoor expansion valve 44a and that of the second indoor expansion valve 44b may be controlled by the control unit 7 so that the degree of subcooling of the refrigerant flowing through the outlet of the first indoor heat exchanger 41a and that of the refrigerant flowing through the outlet of the second indoor heat exchanger 41b match a predetermined value during a heating operation. In this case, for example, the control unit 7 can control the valve opening degree of the first indoor expansion valve 44a and that of the second indoor expansion valve 44b so that a value obtained by subtracting a temperature detected by the first indoor liquid-side refrigerant temperature sensor 49a from a saturation temperature corresponding to a refrigerant pressure detected by the discharge pressure sensor 33 and a value obtained by subtracting a temperature detected by the second indoor liquid-side refrigerant temperature sensor 49b from the saturation temperature match a predetermined value. As an alternative to the above-described control, for example, the control unit 7 may control the opening degree of the first indoor expansion valve 44a and that of the second indoor expansion valve 44b so that a liquid refrigerant is supplied to the inlet of the liquid-side connection pipe 5 or may control the opening degrees thereof so that a liquid refrigerant passes through the inlet of the liquid-side connection pipe 5 while a refrigerant in a gas-liquid two-phase state that has been subjected to pressure loss passes through the outlet thereof.

Accordingly, the refrigerant that condenses in the first indoor heat exchanger 41a, passes through the first indoor expansion valve 44a, and further flows through the first indoor liquid-side branch pipe 51 and the refrigerant that condenses in the second indoor heat exchanger 41b, passes through the second indoor expansion valve 44b, and further flows through the second indoor liquid-side branch pipe 52 merge at the branch point X and fed to the main liquid-side connection pipe 50 of the liquid-side connection pipe 5. Here, the refrigerant passing through the first indoor heat exchanger 41a and the refrigerant passing through the second indoor heat exchanger 41b are supplied to the liquid-side connection pipe 5 without being cooled (without the refrigerant density being increased).

The refrigerant flowing through the main liquid-side connection pipe 50 of the liquid-side connection pipe 5 is supplied to the outdoor unit 2 through the liquid-side shutoff valve 24.

The refrigerant passing through the liquid-side shutoff valve 24, flowing through the outdoor liquid refrigerant pipe 23, and passing through the subcooling heat exchanger 12 is decompressed by the outdoor expansion valve 28 to the low pressure in the refrigeration cycle. Specifically, the valve opening degree of the outdoor expansion valve 28 is controlled by the control unit 7 so that the degree of superheating of a refrigerant that is sucked into the compressor 21 matches the target degree of superheating. In this case, the control unit 7 may obtain the degree of superheating of the refrigerant that is sucked into the compressor 21 by subtracting the saturation temperature of the refrigerant obtained by converting a pressure detected by the suction pressure sensor 32 from a temperature detected by the suction temperature sensor 34.

The refrigerant is fed to the outdoor heat exchanger 22, evaporates, and is again sucked into the compressor 21 via the four-way switching valve 27 and the accumulator 29.

(3) Determination of Cooling Load and Heating Load at Location where Refrigeration Apparatus 1 is to be Constructed Before the refrigeration apparatus 1 is constructed, a maximum cooling load and a maximum heating load at a location where the refrigeration apparatus 1 is to be constructed are first obtained.

The method for determining the maximum cooling load and the maximum heating load may be arbitrary, and a publicly known specific method can be used. For example, the maximum cooling load and the maximum heating load can be obtained based on the climate characteristics of a region in which the refrigeration apparatus 1 is constructed and based on the thermal insulation performance of a building in which the refrigeration apparatus 1 is constructed.

(4) Determination of Refrigeration Apparatus 1 Having Rated Cooling Capacity with which Maximum Cooling Load can be Handled and Having Rated Heating Capacity with which Maximum Heating Load can be Handled In (3) above, the maximum cooling load and the maximum heating load at the location where the refrigeration apparatus 1 is constructed are determined. Now, the refrigeration apparatus 1 having a rated cooling capacity with which the maximum cooling load can be handled and having a rated heating capacity with which the maximum heating load can be handled is obtained.

Specifically, a combination of the outdoor unit 2 and the indoor units 4a and 4b having a rated cooling capacity with which the maximum cooling load at the location where the refrigeration apparatus 1 is constructed can be handled and having a rated heating capacity with which the maximum heating load at the location can be handled is determined.

Here, when a combination of the outdoor unit 2 and the indoor units 4a and 4b having a rated cooling capacity with which the maximum cooling load at the location where the refrigeration apparatus 1 is installed can be handled and having a rated heating capacity with which the maximum heating load at the location can be handled is determined, the rated cooling capacity and the rated heating capacity of the refrigeration apparatus 1 including the combination of the outdoor unit 2 and the indoor units 4a and 4b are determined.

The values of the rated cooling capacity and the rated heating capacity are values that are determined using a publicly known method compliant with standards, etc., and values indicated in a brochure may be used.

Here, the ratio of the rated heating capacity relative to the rated cooling capacity be within the following range, namely, rated cooling capacity: rated heating capacity=1.0: 1.0 to 1.0:1.2.

(5) Determination, Etc. Of Pipe Diameter of Liquid-Side Connection Pipe 5 of Refrigeration Apparatus 1 to be Constructed According to (4) described above, the type of the outdoor unit 2 and the types of the indoor units 4a and 4b that constitute the refrigeration apparatus 1 are selected. Then, the liquid-side connection pipe 5 and the gas-side connection pipe 6 for connecting these units are selected.

The pipe length of the main liquid-side connection pipe 50 that constitutes the liquid-side connection pipe 5 and the pipe length of the main gas-side connection pipe 60 that constitutes the gas-side connection pipe 6 are determined in accordance with a property in which the refrigeration apparatus 1 is to be constructed.

The pipe diameters of the first indoor liquid-side branch pipe 51 and the second indoor liquid-side branch pipe 52 and the pipe diameters (inside diameters) of the first indoor gas-side branch pipe 61 and the second indoor gas-side branch pipe 62 are determined in accordance with the capacities of the connected indoor units and the lengths of the respective branch pipes.

Specifically, the pipe diameter (inside diameter) of the main gas-side connection pipe 60 is set to a predetermined pipe diameter in accordance with the refrigerating capacity of the refrigeration apparatus 1 determined as described above and the length of the main gas-side connection pipe 60. As the refrigerating capacity of the refrigeration apparatus 1, the refrigerating capacity of the outdoor unit 2 of the refrigeration apparatus 1 may be used. Alternatively, in a case where the refrigeration apparatus 1 has one indoor unit 4, the refrigerating capacity of the indoor unit 4 may be used, and in a case where the refrigeration apparatus 1 has a plurality of indoor units 4 (the first indoor unit 4a and the second indoor unit 4b), the sum of the refrigerating capacities of the respective indoor units 4 may be used. Specifically, correspondences of a corresponding pipe diameter to each value of the refrigerating capacity and each value of the length are obtained in advance such that the pipe diameter of the main gas-side connection pipe 60 increases as the refrigerating capacity increases and such that the pipe diameter of the main gas-side connection pipe 60 increases as the length of the main gas-side connection pipe 60 increases. Based on these correspondences, the pipe diameter of the main gas-side connection pipe 60 is determined. According to one or more embodiments, the pipe diameter of the main gas-side connection pipe 60 thus determined is determined uniformly regardless of a relation between the heating load and the cooling load at the installation location of the refrigeration apparatus 1.

The pipe diameter (inside diameter) of the main liquid-side connection pipe 50 is temporarily set to a predetermined reference pipe diameter (reference pipe diameter) in accordance with the refrigerating capacity of the refrigeration apparatus 1 determined as described above and the length of the main liquid-side connection pipe 50. As the refrigerating capacity of the refrigeration apparatus 1, the refrigerating capacity of the outdoor unit 2 of the refrigeration apparatus 1 may be used. Alternatively, in a case where the refrigeration apparatus 1 has one indoor unit 4, the refrigerating capacity of the indoor unit 4 may be used, and in a case where the refrigeration apparatus 1 has a plurality of indoor units 4 (the first indoor unit 4a and the second indoor unit 4b), the sum of the refrigerating capacities of the respective indoor units 4 may be used. Specifically, correspondences of a corresponding pipe diameter to each value of the refrigerating capacity and each value of the length are obtained in advance such that the pipe diameter of the main liquid-side connection pipe 50 increases as the refrigerating capacity increases and such that the pipe diameter of the main liquid-side connection pipe 50 increases as the length of the main liquid-side connection pipe 50 increases. Based on these correspondences, the reference pipe diameter of the main liquid-side connection pipe 50 is temporarily set.

Here, the reference pipe diameter of the main liquid-side connection pipe 50 that is temporarily set is corrected to a pipe diameter smaller than the reference pipe diameter of the main liquid-side connection pipe 50 as a cooling-heating ratio (maximum heating load/maximum cooling load) decreases. The cooling-heating ratio is a value that is obtained from the maximum cooling load and the maximum heating load at the location where the refrigeration apparatus 1 is constructed, the maximum cooling load and the maximum heating load being determined in (3) above, and is a value obtained by dividing the maximum heating load by the maximum cooling load. The pipe diameter thus corrected is determined to be the final pipe diameter of the main liquid-side connection pipe 50.

Here, the degree of "correcting the reference pipe diameter to a smaller pipe diameter as the cooling-heating ratio decreases" may be different depending on the refrigerating capacity of the refrigeration apparatus 1 that is installed. That is, it is preferable that, in a case where the cooling-heating ratio in an environment in which the refrigeration apparatus 1 is constructed is almost the same, correspondences be determined so that the degree of correcting the reference pipe diameter to a smaller pipe diameter differs in accordance with the refrigerating capacity of the refrigeration apparatus 1. More specifically, in a case where the cooling-heating ratio in the environment in which the refrigeration apparatus 1 is constructed is similarly small, correspondences be determined so that the degree of correcting the reference pipe diameter to a smaller pipe diameter increases as the refrigerating capacity of the refrigeration apparatus 1 increases.

Further, the fact that the pipe diameter of the main liquid-side connection pipe 50 may differ in accordance with the cooling-heating ratio as described above may be included in, for example, the installation manual of the refrigeration apparatus 1.

A specific degree of making the reference pipe diameter of the main liquid-side connection pipe 50 temporarily set smaller in accordance with the cooling-heating ratio is determined in advance so that the pipe diameter of the main liquid-side connection pipe 50 can be made smaller to the extent possible as long as the pressure loss of the refrigerant passing through the main liquid-side connection pipe 50 is within an allowable range. That is, the lower limit of the pipe diameter of the main liquid-side connection pipe 50 is determined so that, in a heating operation that is performed to handle the maximum heating load described above, a pressure loss smaller than a pressure loss that is allowed in a case of providing a liquid refrigerant to the main liquid-side connection pipe 50 is achieved.

The pressure loss that is allowed in the case of providing a liquid refrigerant to the main liquid-side connection pipe 50 may be obtained from, for example, a relational expression that is obtained in advance as a value based on the refrigerating capacities of the outdoor unit 2, the first indoor unit 4a, and the second indoor unit 4b that constitute the refrigeration apparatus 1, the cooling-heating ratio at the location where the refrigeration apparatus 1 is installed, the length of the longest portion of the liquid-side connection pipe 5 (from the liquid-side shutoff valve 24 to the inlet of the furthest indoor unit), the number of branch points on the liquid-side connection pipe 5, etc. Specifically, in a case where the refrigerating capacity of the outdoor unit 2, the refrigerating capacity of the first indoor unit 4a, and the refrigerating capacity of the second indoor unit 4b are large and also the cooling-heating ratio at the location where the refrigeration apparatus 1 is installed is large, the flow velocity of the refrigerant flowing through the refrigerant circuit 10 tends to increase, and therefore, the value of the pressure loss when a liquid refrigerant is provided to the main liquid-side connection pipe 50 tends to increase. As the length of the longest portion of the liquid-side connection pipe 5 (from the liquid-side shutoff valve 24 to the inlet of the furthest indoor unit) increases, the pressure loss to which the liquid refrigerant flowing through the liquid-side connection pipe 5 is subjected tends to increase. Further, as the number of branch points on the liquid-side connection pipe 5 increases, the pressure loss to which the liquid refrigerant flowing through the liquid-side connection pipe 5 is subjected tends to increase. In accordance with the relational expression obtained in advance based on relations between the refrigerating capacities, the maximum loads, the pipe length, and the number of branches, and corresponding pressure losses, the allowable pressure loss (the upper limit of the pressure loss) in the case of providing a liquid refrigerant to the main liquid-side connection pipe 50 may be determined.

It is possible to obtain in advance correspondences between the cooling-heating ratio calculated from the maximum heating load and the maximum cooling load and the degree of correcting the reference pipe diameter to a smaller pipe diameter as a table. That is, a table in which the "decrease correction rate of the reference pipe diameter of the main liquid-side connection pipe 50" is specified in advance for each of the plurality of ranges of the "cooling-heating ratio" in a stepwise manner should be prepared for each type of the refrigeration apparatus 1. The table specified with such a method may be included in, for example, the installation manual of the refrigeration apparatus 1.

(6) Determination of Amount of Refrigerant

For the refrigeration apparatus 1 for which the capacity of each of the outdoor unit 2, the first indoor unit 4a, and the second indoor unit 4b and the pipe length and the pipe diameter of each of the liquid-side connection pipe 5 and the gas-side connection pipe 6 are determined as described above, an amount of refrigerant with which the refrigeration cycle operation can be appropriately performed in the refrigerant circuit 10 of the refrigeration apparatus 1 is obtained.

Here, the specific method for determining the amount of refrigerant in the refrigerant circuit 10 may be arbitrary, and a publicly known method is used. For example, the amount of refrigerant in the refrigerant circuit 10 may be obtained so as to increase as the capacity of the outdoor unit 2, the capacity of the first indoor unit 4a, and the refrigerating capacity of the second indoor unit 4b increase, so as to decrease as the pipe diameter of the main liquid-side connection pipe 50 decreases, so as to increase as the length of the main liquid-side connection pipe 50 increases, so as to increase as the length of the first indoor liquid-side branch pipe 51 increases, so as to increase as the length of the second indoor liquid-side branch pipe 52 increases, and so as to increase as the number of indoor units (the number of branch pipes) increases.

In a case where the outdoor unit 2 is charged in advance with a predetermined amount of refrigerant in a state where the liquid-side connection pipe 5, the gas-side connection pipe 6, the first indoor unit 4a, the second indoor unit 4b, etc. are not connected thereto, the refrigerant circuit 10 may be additionally charged with a refrigerant for an amount obtained by subtracting the amount of refrigerant with which the outdoor unit 2 is charged in advance from the determined amount of refrigerant.

(7) Features of Pipe Diameter Determination Method

When a refrigeration apparatus is constructed, usually, a maximum cooling load and a maximum heating load at the construction site are investigated, and a refrigeration apparatus constituted by an outdoor unit and an indoor unit having refrigerating capacities with which these maximum loads can be handled is selected. Here, in usual construction, in a case where a refrigeration apparatus constituted by a specific outdoor unit and a specific indoor unit is selected, the inside diameters of both the main liquid-side connection pipe and the main gas-side connection pipe for connecting the outdoor unit and the indoor unit are uniformly determined.

On the other hand, in the pipe diameter determination method according to one or more embodiments, the refrigeration apparatus 1 constituted by the outdoor unit 2 and the indoor units 4 each having a refrigerating capacity with which both the maximum cooling load and the maximum heating load at the construction site can be handled is selected. Thereafter, the pipe diameter of the main liquid-side connection pipe 50 used in the refrigeration apparatus 1 is not uniformly determined, but the reference pipe diameter of the main liquid-side connection pipe 50 is temporarily set in accordance with the refrigerating capacity of the refrigeration apparatus 1 and the length of the main liquid-side connection pipe 50, and the reference pipe diameter is corrected to a smaller pipe diameter as the value of the cooling-heating ratio (maximum heating load/maximum cooling load) decreases to determine the pipe diameter of the main liquid-side connection pipe 50. Accordingly, it is possible to reduce the amount of refrigerant with which the refrigeration apparatus 1 is charged while the pressure loss of the refrigerant passing through the main liquid-side connection pipe 50 is reduced so as to be within the allowable range.

More specifically, in the refrigeration apparatus 1 for which the pipe diameter determination method according to one or more embodiments is used, during a cooling operation, a refrigerant that passes through the outdoor heat exchanger 22 and is to be fed to the liquid-side connection pipe 5 is cooled by the subcooling heat exchanger 12 and becomes a refrigerant having a high density. On the other hand, during a heating operation, refrigerants that radiate heat in the first indoor heat exchanger 41a and the second indoor heat exchanger 41b, and thereafter, flow toward the liquid-side connection pipe 5 are not subjected to cooling that corresponds to the cooling process performed by the subcooling heat exchanger 12 during a cooling operation. Therefore, in the refrigeration apparatus 1, it is likely that a liquid refrigerant having a high density is supplied to the liquid-side connection pipe 5 during a cooling operation, while the density of a refrigerant that is supplied to the liquid-side connection pipe 5 is low, and a refrigerant in a gas-liquid two-phase state tends to be supplied during a heating operation. Therefore, the pressure loss of the refrigerant passing through the liquid-side connection pipe 5 is reduced during a cooling operation, while the pressure loss of the refrigerant flowing through the liquid-side connection pipe 5 tends to increase during a heating operation unlike during a cooling operation.

Here, according to one or more embodiments, the refrigeration apparatus 1 having a rated cooling capacity and a rated heating capacity with which the maximum cooling load and the maximum heating load in the environment in which the refrigeration apparatus 1 is constructed is selected and constructed. In a case where the refrigeration apparatus 1 having a rated cooling capacity and a rated heating capacity with which both the maximum cooling load and the maximum heating load can be handled is thus selected, the heating capacity may be excessive relative to the maximum heating load in a case where, for example, the refrigeration apparatus 1 is used in an environment in which the maximum heating load is relatively small. In the case where the heating capacity becomes excessive as described above, in one or more embodiments, as the value of the cooling-heating ratio (maximum heating load/maximum cooling load) in the construction environment decreases, the pipe diameter of the main liquid-side connection pipe 50 that is used is made smaller even for the refrigeration apparatus 1 having the same refrigerating capacity. Accordingly, in the case where the heating capacity of the refrigeration apparatus 1 is excessive, it is possible to make the pipe diameter of the main liquid-side connection pipe 50 that is employed smaller while the pressure loss of the refrigerant flowing through the main liquid-side connection pipe 50 during a heating operation is kept within the allowable range.

In the pipe diameter determination method of one or more embodiments, the relations described above are taken into consideration, and the pipe diameter of the main liquid-side connection pipe 50 is made smaller as the value of the cooling-heating ratio (maximum heating load/maximum cooling load) in the environment in which the refrigeration apparatus 1 is constructed decreases. Accordingly, it is possible to achieve an effect in which the amount of refrigerant with which the refrigeration apparatus 1 is charged is reduced while the pressure loss of the refrigerant flowing through the main liquid-side connection pipe 50 during a heating operation is kept within the allowable range.

Even in a case where the pipe diameter of the main liquid-side connection pipe 50 is corrected to a smaller pipe diameter, the refrigerant that flows through the main liquid-side connection pipe 50 is a liquid refrigerant that is cooled and has a high density during a cooling operation, and therefore, the pressure loss is made smaller than that during a heating operation in which a refrigerant in a gas-liquid two-phase state tends to flow, and a shortage of the cooling capacity occurs to a small degree.

Further, in the refrigeration apparatus 1 according to one or more embodiments, during a cooling operation, the refrigerant that is cooled by the subcooling heat exchanger 12, has a high density, and is in a liquid single-phase state is supplied to the liquid-side connection pipe 5. When the pipe diameter of the liquid-side connection pipe 5 to which the refrigerant in a liquid single-phase state having a high density is supplied is made smaller, the effect in which the amount of refrigerant with which the refrigerant circuit 10 is charged is reduced can be made noticeable.

As described above, when the amount of refrigerant with which the refrigerant circuit 10 of the refrigeration apparatus 1 is charged is reduced, it is possible to not only reduce refrigerant costs but also reduce the amount of leakage in case R32, which is a mildly flammable refrigerant, leaks out and decrease the likelihood of ignition.

(8) Pipe Diameter Determination Apparatus

Figure 3:
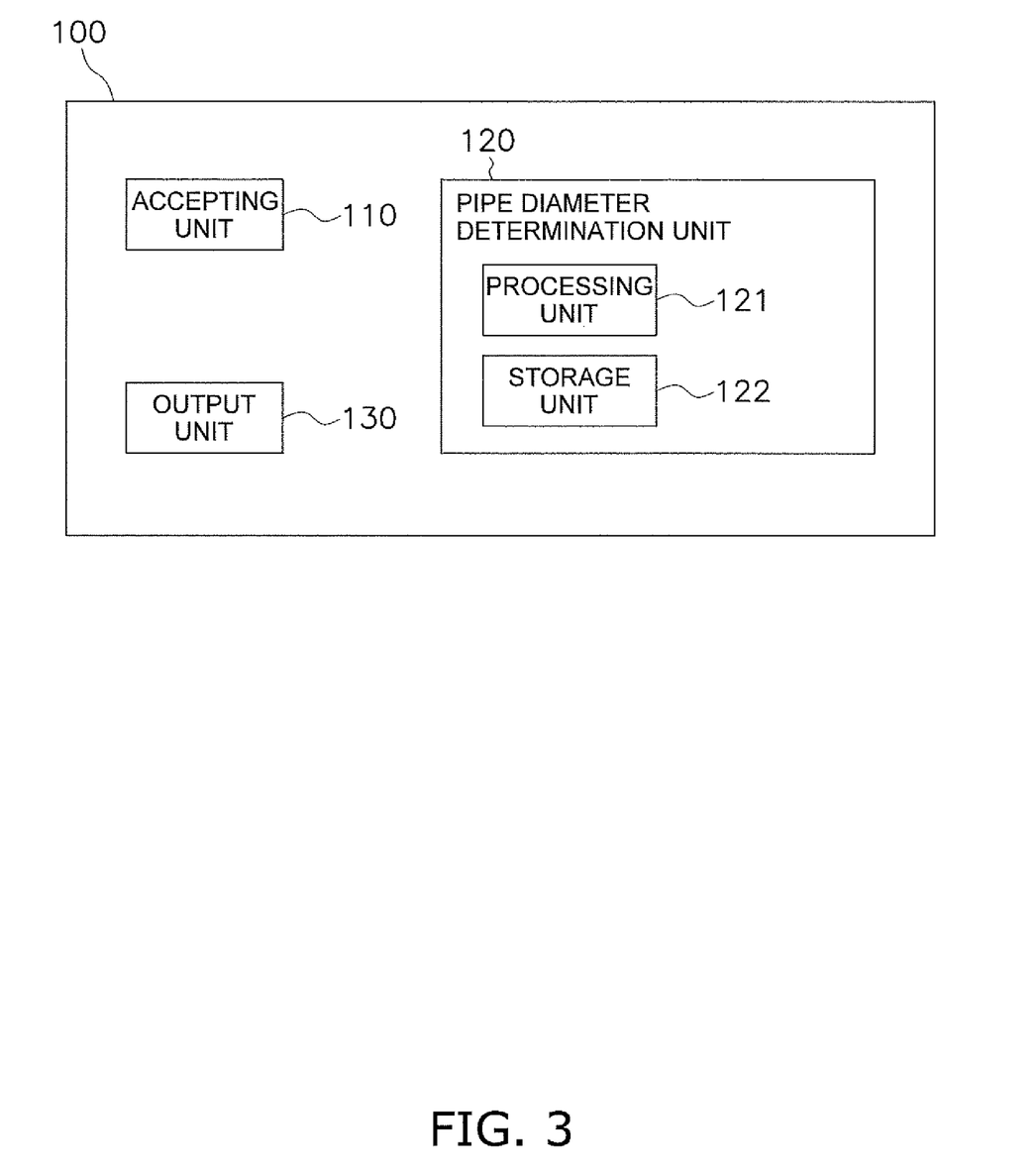
FIG. 3 is a block diagram of a pipe diameter determination apparatus.

Now, a pipe diameter determination apparatus 100 is described with reference to the drawings.

The pipe diameter determination apparatus 100 causes a computer to perform the pipe diameter determination method according to one or more embodiments to automatically determine the amount of refrigerant, and is used for a target, namely, the refrigeration apparatus 1 described in the above-described pipe diameter determination method.

The pipe diameter determination apparatus 100 includes an accepting unit 110, a pipe diameter determination unit 120, and an output unit 130, as illustrated in the block diagram in FIG. 3.

The accepting unit 110 accepts various types of information input by a constructor, the information including the refrigerating capacity of the refrigeration apparatus 1 constructed on site, the number of indoor units (the number of branch pipes), the length of the liquid-side connection pipe 5 (the length of the main liquid-side connection pipe 50, the length of the first indoor liquid-side branch pipe 51, and the length of the second indoor liquid-side branch pipe 52), and the length of the gas-side connection pipe 6 (the length of the main gas-side connection pipe 60, the length of the first indoor gas-side branch pipe 61, and the length of the second indoor gas-side branch pipe 62). The accepting unit 110 further accepts information about the rated cooling capacity and the rated heating capacity of the refrigeration apparatus 1 input by the constructor. The accepting unit 110 may further accept information about a maximum cooling load and a maximum heating load at a location where the refrigeration apparatus 1 is constructed. The accepting unit 110 accepts user input via a screen, such as a touch panel, described below.

The pipe diameter determination unit 120 determines the pipe diameter of the main liquid-side connection pipe 50 of the liquid-side connection pipe 5 used in the refrigerant circuit 10 of the refrigeration apparatus 1 based on the information accepted by the accepting unit 110. The pipe diameter determination unit 120 has a processing unit 121 constituted by a CPU, etc. that performs various types of information processing and a storage unit 122 constituted by a ROM and a RAM.

The processing unit 121 of the pipe diameter determination unit 120 uses the information accepted by the accepting unit 110 and information stored in the storage unit 122 to perform a pipe diameter determination process in a manner similar to that described above as the pipe diameter determination method.

Specifically, the storage unit 122 stores therein (A) data indicating the pipe diameter of the main gas-side connection pipe 60 corresponding to the refrigerating capacity of the refrigeration apparatus 1 and the length of the main gas-side connection pipe 60 (data indicating relations in which the pipe diameter of the main gas-side connection pipe 60 increases as the refrigerating capacity increases and the pipe diameter of the main gas-side connection pipe 60 increases as the length of the main gas-side connection pipe 60 increases), (B) data indicating the reference pipe diameter of the main liquid-side connection pipe 50 corresponding to the refrigerating capacity of the refrigeration apparatus 1 and the length of the main liquid-side connection pipe 50 (data indicating relations in which the reference pipe diameter of the main liquid-side connection pipe 50 increases as the refrigerating capacity increases and the reference pipe diameter of the main liquid-side connection pipe 50 increases as the length of the main liquid-side connection pipe 50 increases), and (C) data indicating the correction rate of the reference pipe diameter of the main liquid-side connection pipe 50 corresponding to the cooling-heating ratio (maximum heating load/maximum cooling load) (data indicating a reduction correction rate corresponding to each of the plurality of ranges of the cooling-heating ratio).

The processing unit 121 first determines the pipe diameter of the main gas-side connection pipe 60 corresponding to the refrigerating capacity of the refrigeration apparatus 1 and the length of the main gas-side connection pipe 60, the refrigerating capacity and the length being accepted by the accepting unit 110.

The processing unit 121 sets the reference pipe diameter of the main liquid-side connection pipe 50 corresponding to the refrigerating capacity of the refrigeration apparatus 1 and the length of the main liquid-side connection pipe 50, the refrigerating capacity and the length being accepted by the accepting unit 110.

Further, the processing unit 121 calculates the value of the cooling-heating ratio (maximum heating load/maximum cooling load) in the environment in which the refrigeration apparatus 1 is constructed, the maximum heating load and the maximum cooling load being accepted by the accepting unit 110. The processing unit 121 corrects the reference pipe diameter of the main liquid-side connection pipe 50 to a smaller pipe diameter as the calculated cooling-heating ratio decreases to determine the final pipe diameter of the main liquid-side connection pipe 50.

The output unit 130 displays and outputs the final pipe diameter determined by the pipe diameter determination unit 120. Specifically, the output unit 130 displays on and outputs to the screen, which is, for example, a touch panel, the value of the final pipe diameter of the main liquid-side connection pipe 50.

(9) Modifications

One or more embodiments can be modified as appropriate as modifications described below. Each modification may be combined with the other modifications and applied as long as there is no contradiction.

(9-1) Modification A

According to one or more embodiments, the example case has been described where the refrigeration apparatus 1 is charged with R32, which is a mildly flammable refrigerant.

However, the mildly flammable refrigerant with which the refrigeration apparatus 1 is charged is not limited to R32, and a mildly flammable refrigerant, such as R143a, R717, NH3, R1234yf refrigerant mixture, or R1234ze refrigerant mixture, may be used. R410A, R134a, R22, and R125, which are usually regarded as non-flammable refrigerants, are not included in the mildly flammable refrigerant.

(9-2) Modification B

According to one or more embodiments, the example case has been described where, in the pipe diameter determination apparatus 100, the pipe diameter of the main liquid-side connection pipe 50 is determined based on information accepted by the accepting unit 110. However, in the pipe diameter determination apparatus, in addition to the pipe diameter, the amount of refrigerant with which the refrigeration apparatus 1 is charged may be determined by the processing unit 121 based on information accepted by the accepting unit 110.

Specifically, a predetermined relational expression or data list may be stored in advance in the storage unit 122, the relational expression or the data list being set such that the amount of refrigerant increases as the refrigerating capacity of the outdoor unit 2, the refrigerating capacity of the first indoor unit 4a, and the refrigerating capacity of the second indoor unit 4b increase, the amount of refrigerant decreases as the pipe diameter of the main liquid-side connection pipe 50 decreases, the amount of refrigerant increases as the length of the main liquid-side connection pipe 50 increases, the amount of refrigerant increases as the length of the first indoor liquid-side branch pipe 51 increases, the amount of refrigerant increases as the length of the second indoor liquid-side branch pipe 52 increases, and the amount of refrigerant increases as the number of indoor units (the number of branch pipes) increases. Then, the processing unit 121 may obtain the amount of refrigerant in the refrigerant circuit 10 based on the relational expression or the data list stored in advance in the storage unit 122 and information accepted by the accepting unit 110.

(9-3) Modification C

According to one or more embodiments, the example case has been described where the pipe diameter determination apparatus 100 functions as an independent apparatus that automatically determines the pipe diameter of the main liquid-side connection pipe 50 of the refrigeration apparatus 1 by using a computer.

Figure 4:
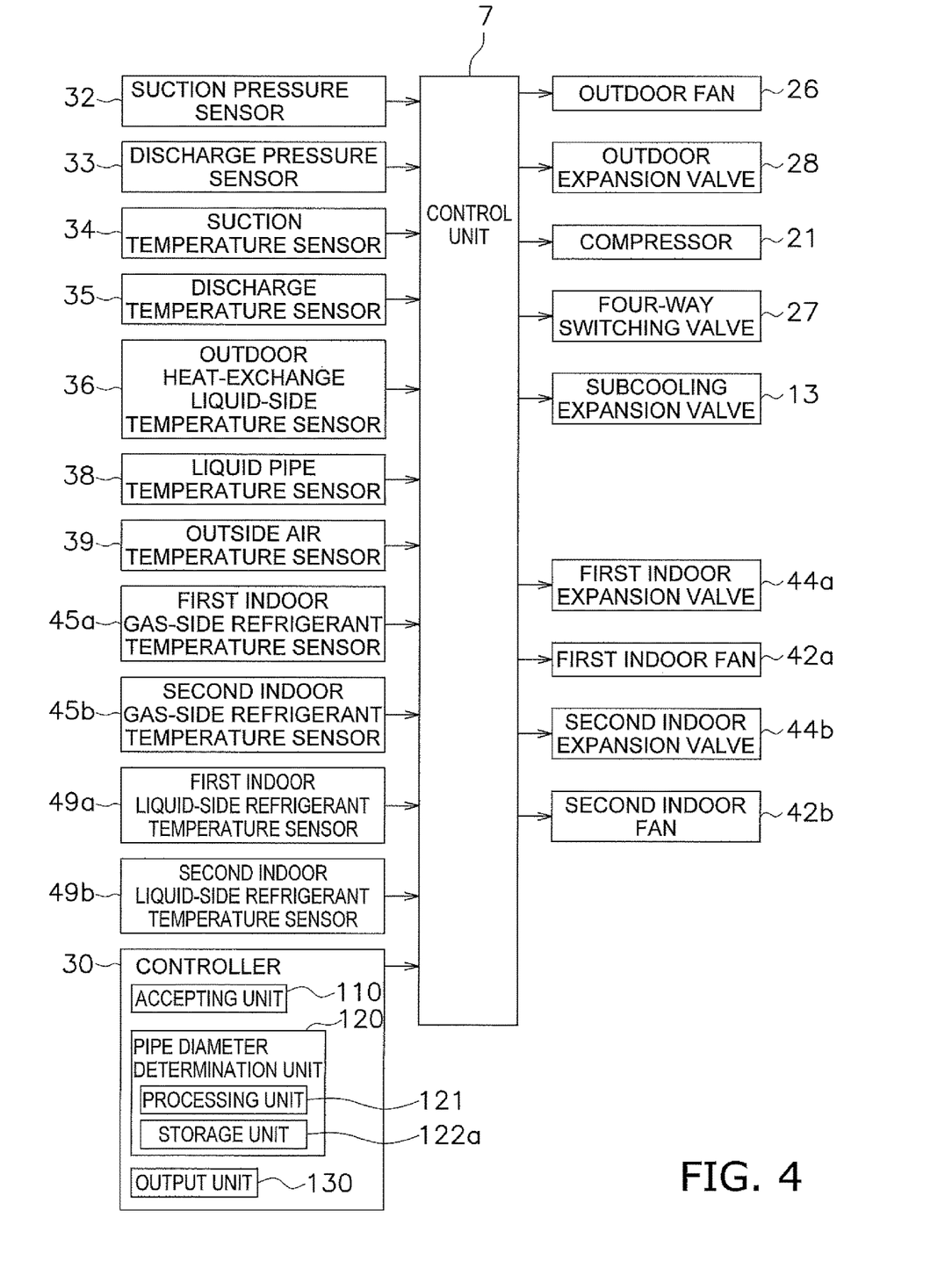
FIG. 4 is a block diagram of the control system of the refrigeration apparatus according to modification C.

However, for example, as illustrated in FIG. 4, the controller 30 of the refrigeration apparatus 1 according to one or more embodiments may include the accepting unit 110, the pipe diameter determination unit 120 having the processing unit 121 and a storage unit 122a, and the output unit 130 that are configured so as to correspond to the pipe diameter determination apparatus 100 described above.

Here, in the storage unit 122a of the pipe diameter determination unit 120 of the controller 30, not only the data stored in the storage unit 122 described above but also data indicating the refrigerating capacity of the refrigeration apparatus 1 may be stored in advance.

In this case, the process for inputting the refrigerating capacity of the refrigeration apparatus 1 into the accepting unit 110 of the controller 30 is not necessary.

The processing unit 121 of the pipe diameter determination unit 120 determines the pipe diameter of the liquid-side connection pipe 5 in a manner similar to that according to one or more embodiments based on various types of information, such as the number of indoor units (the number of branch pipes), the length of the liquid-side connection pipe 5, and the length of the gas-side connection pipe 6, accepted via the accepting unit 110 and the data stored in the storage unit 122a.

(9-4) Modification D

According to one or more embodiments, the example case has been described where the reference pipe diameter of the main liquid-side connection pipe 50 is temporarily set such that the pipe diameter of the main liquid-side connection pipe 50 increases as the refrigerating capacity of the refrigeration apparatus 1 increases and the pipe diameter of the main liquid-side connection pipe 50 increases as the length of the main liquid-side connection pipe 50 increases, and the reference pipe diameter of the main liquid-side connection pipe 50 is corrected to a smaller pipe diameter as the cooling-heating ratio decreases to thereby determine the pipe diameter of the main liquid-side connection pipe 50.

However, the method for determining the pipe diameter of the main liquid-side connection pipe 50 is not limited to the determination method according to this procedure. For example, a predetermined relational expression composed of the refrigerating capacity of the refrigeration apparatus 1, the length of the main liquid-side connection pipe 50, and the cooling-heating ratio may be prepared in advance, and this relational expression may be used to obtain the pipe diameter of the main liquid-side connection pipe 50.

(9-5) Modification E

According to one or more embodiments, the case has been described where, as the value indicating the ratio of the maximum heating load relative to the maximum cooling load in an environment in which the refrigeration apparatus 1 is constructed, for example, the cooling-heating ratio (maximum heating load/maximum cooling load), which is a value obtained by dividing the maximum heating load by the maximum cooling load, is used and the pipe diameter of the main liquid-side connection pipe 50 is corrected to a smaller pipe diameter as the cooling-heating ratio decreases.

However, the value used to correct the pipe diameter of the main liquid-side connection pipe 50 for the environment in which the refrigeration apparatus 1 is constructed is not limited to the cooling-heating ratio. For example, an excessive heating value may be calculated by subtracting the value of the maximum heating load in the environment in which the refrigeration apparatus 1 is constructed from the value of the heating capacity of the refrigeration apparatus 1, and the pipe diameter of the main liquid-side connection pipe 50 may be corrected to a smaller pipe diameter as the excessive heating value increases.

(9-6) Modification F

According to one or more embodiments, the case has been described where, as the value indicating the ratio of the maximum heating load relative to the maximum cooling load in an environment in which the refrigeration apparatus 1 is constructed, for example, the cooling-heating ratio (maximum heating load/maximum cooling load), which is a value obtained by dividing the maximum heating load by the maximum cooling load, is used and the pipe diameter of the main liquid-side connection pipe 50 is corrected to a smaller pipe diameter as the cooling-heating ratio decreases and where the pipe diameter of the main gas-side connection pipe 60 is determined uniformly regardless of the relation between the maximum cooling load and the maximum heating load.

However, also for the pipe diameter of the main gas-side connection pipe 60, a reference pipe diameter, which is a predetermined pipe diameter, may be temporarily set based on the refrigerating capacity of the refrigeration apparatus 1 and the length of the main gas-side connection pipe 60, and the temporarily set pipe diameter may be corrected in accordance with the relation between the maximum cooling load and the maximum heating load, etc. to thereby determine the final pipe diameter of the main gas-side connection pipe 60. For example, the temporarily set reference pipe diameter of the main gas-side connection pipe 60 may be corrected such that, in a case where the maximum cooling load is larger than the maximum heating load in the environment in which the refrigeration apparatus 1 is constructed, the temporarily set reference pipe diameter is corrected to a smaller pipe diameter as the maximum cooling load exceeds the maximum heating load to a larger degree or, in a case where the cooling capacity of the refrigeration apparatus 1 is larger than the maximum cooling load in the environment in which the refrigeration apparatus 1 is constructed, the temporarily set reference pipe diameter is corrected to a smaller pipe diameter as the cooling capacity exceeds the maximum cooling load to a larger degree to thereby determine the final pipe diameter of the main gas-side connection pipe 60.

The pipe diameter of the main gas-side connection pipe 60 of the refrigeration apparatus 1 can be thus corrected for the following reason. The density of the gas refrigerant that flows through the main gas-side connection pipe 60 during a cooling operation is equal to or lower than half (or equal to or lower than one-third) the density of the gas refrigerant during a heating operation, and the pressure loss to which the gas refrigerant flowing through the main gas-side connection pipe 60 is subjected during a cooling operation is equal to or larger than twice (or equal to or larger than three times) the pressure loss during a heating operation, and therefore, the pipe diameter of the main gas-side connection pipe 60 is determined in accordance with rate control based on the pressure loss to which the refrigerant is subjected during a cooling operation.

Embodiments of the present disclosure have been described above. It should be understood that various modifications can be made to the embodiments and specifics without departing from the spirit and scope of the present disclosure specified in the claims.

REFERENCE SIGNS LIST 1 refrigeration apparatus
2 outdoor unit
4a, 4b indoor unit
5 liquid-side connection pipe
6 gas-side connection pipe
7 control unit
10 refrigerant circuit
12 subcooling heat exchanger (cooling portion)
21 compressor
22 outdoor heat exchanger
23 outdoor liquid refrigerant pipe
24 liquid-side shutoff valve
25 gas-side shutoff valve
27 four-way switching valve
28 outdoor expansion valve
29 accumulator
30 controller (pipe diameter determination apparatus)
31 outdoor control unit
32 suction pressure sensor
33 discharge pressure sensor
34 suction temperature sensor
35 discharge temperature sensor
36 outdoor heat-exchange liquid-side temperature sensor
38 liquid pipe temperature sensor
39 outside air temperature sensor
41a first indoor heat exchanger
41b second indoor heat exchanger
44a first indoor expansion valve
44b second indoor expansion valve
45a first indoor gas-side refrigerant temperature sensor
45b second indoor gas-side refrigerant temperature sensor
46a first indoor control unit
46b second indoor control unit
49a first indoor liquid-side refrigerant temperature sensor
49b second indoor liquid-side refrigerant temperature sensor
50 main liquid-side connection pipe
51 first indoor liquid-side branch pipe
52 second indoor liquid-side branch pipe
60 main gas-side connection pipe
61 first indoor gas-side branch pipe
62 second indoor gas-side branch pipe
100 pipe diameter determination apparatus
110 accepting unit (information obtaining unit)
120 pipe diameter determination unit
121 processing unit (information obtaining unit)
122 storage unit
122a storage unit (information obtaining unit)
130 output unit

The invention claimed is:

1. A method for determining a pipe diameter of a liquid-side connection pipe in a refrigeration apparatus to be installed that performs a cooling operation and a heating operation, where the refrigeration apparatus includes: an outdoor unit having a compressor and an outdoor heat exchanger; an indoor unit having an indoor heat exchanger; and the liquid-side connection pipe and a gas-side connection pipe that connect the outdoor unit with the indoor unit, a cooling capacity of the outdoor unit and the indoor unit exceeds a maximum cooling load depending on an installation location of the refrigeration apparatus, a heating capacity of the outdoor unit and the indoor unit exceeds a maximum heating load depending on the installation location of the refrigeration apparatus, and a reference pipe diameter of the liquid-side connection pipe is determined in advance in accordance with the cooling capacity and the heating capacity, the method comprising:

causing a computer to obtain the heating capacity, the maximum heating load, and the maximum cooling load;

causing the computer to determine the pipe diameter of the liquid-side connection pipe by subtracting an amount of reduction from the reference pipe diameter, the amount of reduction being based on either:
a value obtained by dividing the maximum heating load by the maximum cooling load, or
a value obtained by subtracting the maximum heating load from the heating capacity; and installing, as the liquid-side connection pipe of the refrigeration apparatus, a pipe of the determined pipe diameter.

2. The method according to claim 1, wherein
the outdoor unit has a cooling portion that is different from the outdoor heat exchanger and that cools a refrigerant before the liquid-side connection pipe only when the refrigeration apparatus is in a cooling operation,
the amount of reduction is increased when the value obtained by dividing the maximum heating load by the maximum cooling load decreases or when the value obtained by subtracting the maximum heating load from the heating capacity increases.

3. The method according to claim 2, wherein the amount of reduction is determined using a table that shows the amount of reduction in a stepwise manner with respect to the value obtained by dividing the maximum heating load by the maximum cooling load or the value obtained by subtracting the maximum heating load from the heating capacity.

4. The method according to claim 1, wherein the refrigeration apparatus is configured such that a refrigerant is in a liquid single-phase state in the liquid-side connection pipe.

5. The method according to claim 1, wherein a refrigerant used in the refrigeration apparatus is mildly flammable.

6. The method according to claim 2, wherein the refrigeration apparatus is configured such that the refrigerant is in a liquid single-phase state in the liquid-side connection pipe.

7. The method according to claim 3, wherein the refrigeration apparatus is configured such that the refrigerant is in a liquid single-phase state in the liquid-side connection pipe.

8. The method according to claim 2, wherein a refrigerant used in the refrigeration apparatus is mildly flammable.

9. The method according to claim 3, wherein a refrigerant used in the refrigeration apparatus is mildly flammable.

10. The method according to claim 4, wherein a refrigerant used in the refrigeration apparatus is mildly flammable.

11. The method according to claim 6, wherein a refrigerant used in the refrigeration apparatus is mildly flammable.

12. The method according to claim 7, wherein a refrigerant used in the refrigeration apparatus is mildly flammable.

* * * * *